United States Patent [19]

Zeiger et al.

[11] Patent Number: 5,307,587
[45] Date of Patent: May 3, 1994

[54] MOLE TRAP

[76] Inventors: Robert E. Zeiger, Rte. 1, Box 490; Larry Tarvin, R.R. #2, Box 298, both of Havana, Ill. 62644

[21] Appl. No.: 52,646
[22] Filed: Apr. 26, 1993
[51] Int. Cl.$^5$ .................................... A01M 23/26
[52] U.S. Cl. ................................................ 43/88
[58] Field of Search ........................ 43/85, 88, 91, 90

[56] References Cited

U.S. PATENT DOCUMENTS

| | | | |
|---|---|---|---|
| 615,851 | 12/1898 | Hooker | 43/88 |
| 622,700 | 4/1899 | Mackintosh | 43/88 |
| 1,184,667 | 5/1916 | Appleby | 43/88 |
| 1,385,024 | 7/1921 | Russell | 43/88 |
| 1,479,853 | 1/1924 | Gambee | 43/88 |
| 1,485,746 | 3/1924 | Ward | 43/88 |
| 1,557,043 | 10/1925 | Graham | 43/88 |
| 1,729,976 | 10/1929 | Wyman | 43/88 |
| 1,764,225 | 6/1930 | Raymond | 43/90 |
| 1,830,675 | 11/1931 | Raymond | 43/90 |
| 2,446,078 | 7/1948 | Churchill | 43/85 |

*Primary Examiner*—Kurt Rowan
*Attorney, Agent, or Firm*—Lockwood, Alex, FitzGibbon & Cummings

[57] ABSTRACT

An animal trap particularly suited for trapping moles. The trap has a frame formed by two interfitting bails or U-shaped members pivotally joined at their legs so as to form a pair of scissor-like clamps. The distal end of each leg of the U-shaped members has one-half of an animal gripping jaw which cooperates with an opposing one-half of a jaw on the distal end on the adjacent leg of the associated U-shaped member. A shaft extends between the legs of the U-shaped members. The opposite ends of the shaft are welded to the legs of one U-shaped member. The legs of the other U-shaped member are pivoted on the shaft. A pair of coil springs are mounted on the shaft the outer ends of which drivingly engage the legs which are pivoted on the shaft. The inner end of each spring drivingly engages a trigger lever which projects from the shaft. The driving torque exerted by the springs urges the jaw halves into their closed animal gripping condition. A trigger is pivotally mounted intermediate its opposite ends on the distal end of the trigger lever. A pan positioned to be sideways engaged by an animal entering the trap is mounted or formed on one end of the trigger. A hook is formed on the opposite end. A trip rod is pivotally mounted at one end on the bight of the U-shaped member to which the shaft is fixed. The distal end of the shaft releasably engages the hook when the trap is set so that the trip rod and trigger mechanism keep the jaws open against the torque of the springs. With the trap set with the jaws in the ground and pointing down, when an animal presses upwards against the pan, it causes the hook to slip off the end of the trip rod and thereby springs the trap.

9 Claims, 2 Drawing Sheets

MOLE TRAP

BACKGROUND AND DESCRIPTION OF THE INVENTION

This invention relates, generally, to animal traps of the type that capture an animal between jaws when the animal trips a trigger mechanism. More particularly, the invention relates to an improved trap for capturing moles when travelling along a mole run. Animal traps of the type which capture an animal between spring actuated jaws generally have a trigger mechanism which is activated by the animal stepping down on a trigger mechanism. The present invention relates to a jaw-type animal trap wherein the trigger mechanism is horizontally oriented and is actuated by an animal pressing up against the trigger with the jaws being vertically oriented. It has been found that an animal trap of this type is particularly suited for trapping moles as they travel along a mole run.

The object of the invention generally stated is the provision of an improved animal trap of the jaw type having, when properly set, vertically oriented animal gripping jaws and a horizontally oriented trigger mechanism which is actuated by an animal engaging the mechanism from underneath. More particularly, the object of the invention is the provision of a mole trap which is particularly suited for capturing moles as they travel along a mole run and enter between vertically oriented jaws and raise or lift a trigger mechanism so as to trip the mechanism and spring the trap.

A further object of the invention is the provision of such an improved trap which is economical to construct and is safe and easy to install and set.

other objects of the invention will be apparent from the following detailed description of the invention taken in conjunction with the accompanying drawings wherein.

Figure 1:
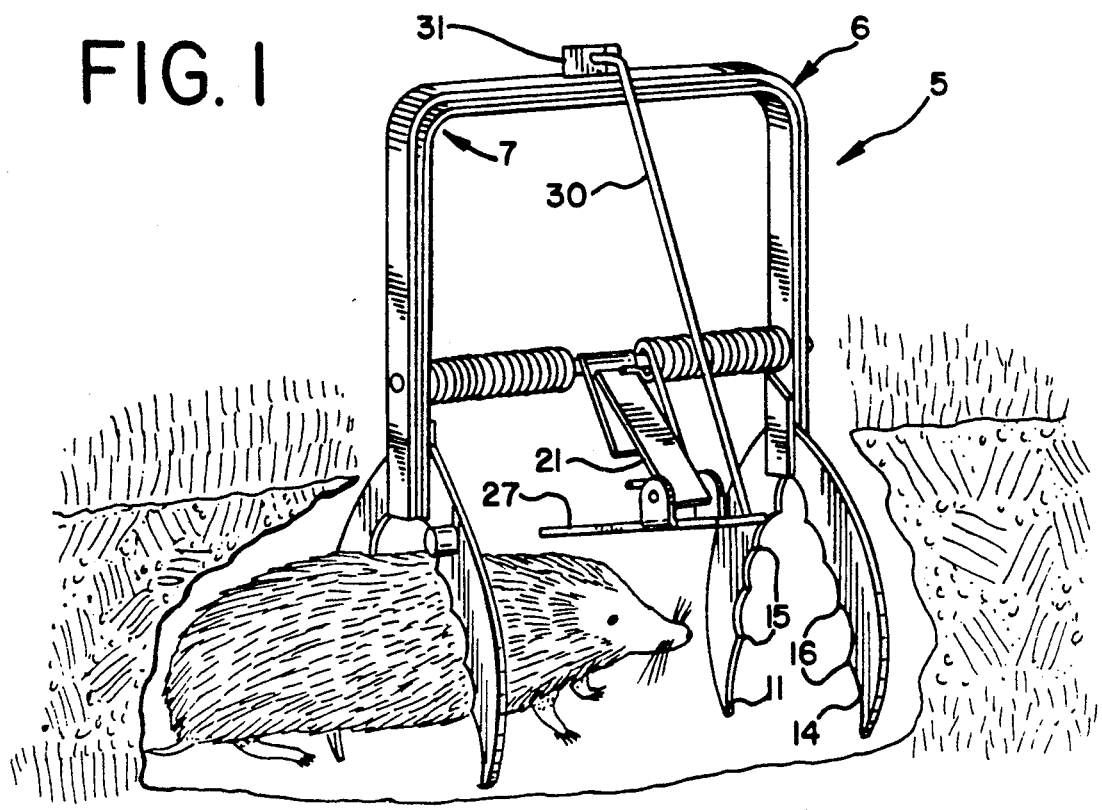
FIG. 1 is a perspective view of a mole trap forming an embodiment of the invention shown in its set condition in a mole run and just about to be sprung by a mole travelling in the run.

Referring to the drawings, a mole trap is indicated generally at 5 which comprises an outer bail or U-shaped member 6 and an interfitting inner bail or U-shaped member 7. The member 6 has a bight portion 8 and side legs 10—10, the distal ends of which carry jaw halves 11—11. Similarly, the inner member 7 has a bight portion 12 and side legs 13—13, the distal ends of which terminate in jaw halves 14—14. The U-shaped members or bails 6 and 7 can be economically formed from strap metal stock and the jaw halves 11 and 14 may be economically stamped from sheet stock so as to have opposing serrations 15 and 16, respectively. The jaws 11 and 14 may be machine welded to the distal ends of the legs 10 and 13 respectively. The jaws are formed of thin material so as to facilitate slicing through the ground when the trap 5 is set in a mole run.

The U-shaped members 6 and 7 are assembled and connected for rotation with respect to each other by means of a transverse shaft or rod 17 the opposite ends of which are secured and fixed to the legs 10 by welding as indicated at 18 whereby the shaft 17 and U-shaped member 6 rotate as a unit. The ends of the shaft 17 project through apertures in the legs 13 whereby the U-shaped member 7 is pivoted and rotatable on the shaft.

A pair of coil springs 20 are mounted on the shaft 17 on opposite sides of a trigger support lever 21 fixedly mounted on the center of the shaft so as to project radially therefrom. The outer end 22 of each spring drivingly engages the top side of the legs 13. The inner end 23 of each spring 20 is L-shaped and drivingly engages the underside of the trigger lever 21 as viewed in the drawings.

Figure 4:
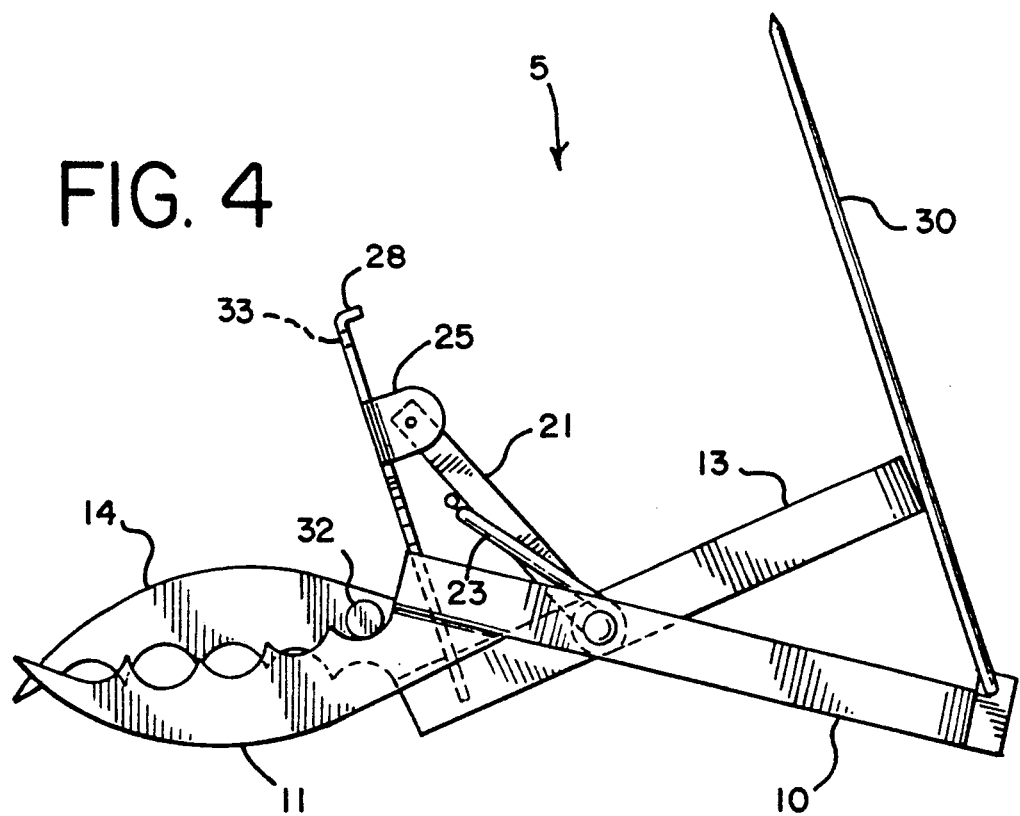
FIG. 4 is a side elevational view corresponding to FIG. 3 but showing the condition of the parts of the trap after it has been sprung.

The springs 20 are installed under tension or torsion so that they exert a torque which forces the bight portions 8 and 12 apart and the jaw halves together as viewed in FIG. 4. It will be understood that the force exerted by the spring ends 23 on the lever 21 are transmitted by way of the shaft 17 to the U-shaped member 6.

The trap 5 has a trigger mechanism which comprises a trigger 24 which may be in the form of a sheet metal stamping and has a pair of ears 25—25 which straddle the distal end of the trigger lever 21 and are pivotally connected thereto by a pin 26. The trigger 24 has a circular pan 27 formed on one end and a hook 28 in the form of a lip on the opposite end. A trip rod 30 is pivotally mounted at its proximal end on a block 31 welded to the back or outer side of the bight 8. The length of the trip rod 30 is such that when the bight portions 8 and 12 are brought together as shown in FIGS. 1 and 3 against the force of the springs 20, the distal end of the rod 30 will catch under the lip or hook 28 when the trigger 24 is in its vertical portion as shown in FIGS. 1, 2 and 3.

Figure 2:
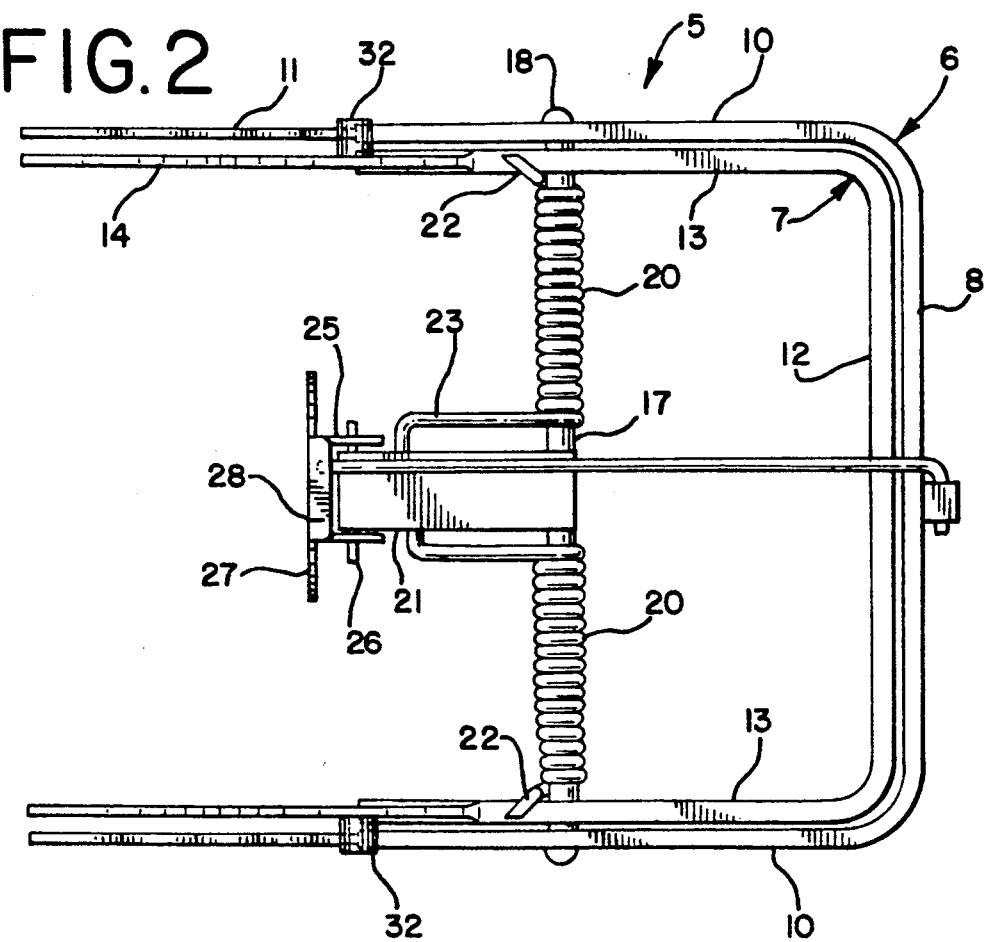
FIG. 2 is a top plan view of the mole trap shown in FIG. 1.
Figure 3:
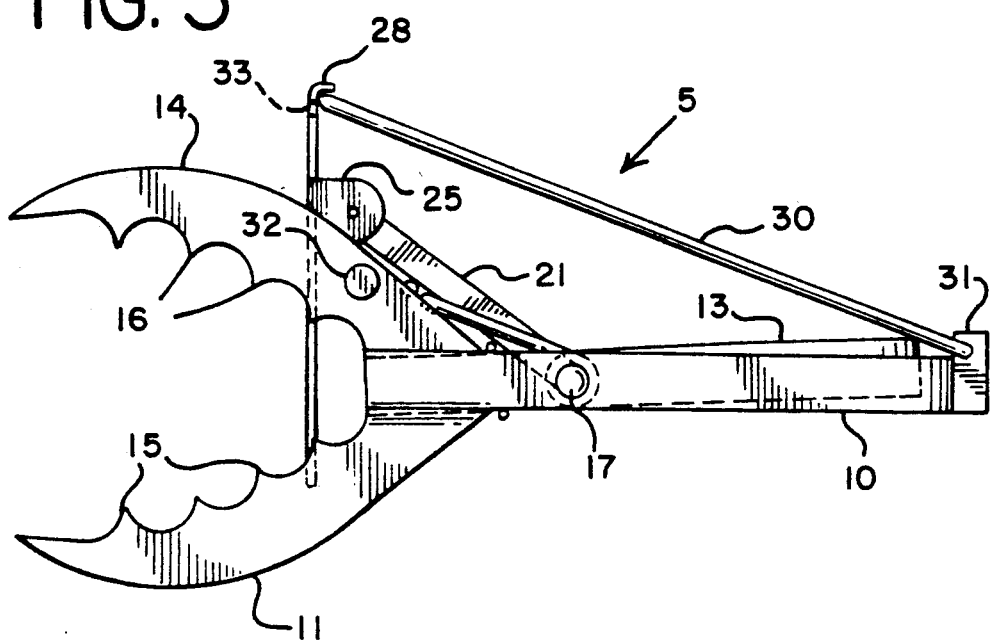
FIG. 3 is a side elevational view of the mole trap shown in FIG. 1.

When the parts have the relationship shown in FIGS. 1-3, it will be seen that the proximal end of the rod 30 engages the top side of the bight 12 so as to maintain the U-shaped members in the relationship shown.

In use, a fresh mole run is located and stepped down on where the trap is to be set so as to flatten the mole run at that point. The trap 5 is then inserted vertically in the ground so that the jaws are aligned with the mole run. The trap is then set causing the jaws 11 and 14 to open and thereby cut tracks or slots in the ground which allow the trap to close quickly when sprung. In setting the trap 5, the trip rod 30 is placed against the hook 28 as shown in FIG. 3 and pressure on the bight portions 8 and 12 gradually released so that the end of the trip rod 30 remains engaged with the hook 28.

When a mole in the tunnel reaches the set trap 5 it will re-dig that area. In doing so, after passing part way through one of the pairs of open jaws 11, 14, the animal will press dirt up against the pan 27 thereby rotating or tilting the trigger 24 so as to release the hook 28 from the end of the trip rod 30. Thereupon, the torque exerted by the spring 20 causes the jaws to snap together so as to capture the animals therebetween. The condition of the trap in the sprung condition (without an animal) is shown in FIG. 4. In order to prevent the jaws 11, 14 from passing beyond their fully closed condition, the jaws 14 are provided with stops 32—32 which may be welded or otherwise secured in place. When the jaws 11 and 14 come together, the stops 32 engage the upper side of the lower jaws 11 as shown in FIG. 4 thereby preventing further rotation of the U-shaped members 6 and 7 relative to each other.

It will be seen that the legs 10, 13 with their jaws 11, 14 respectively, on opposite sides of the trap 5, have a generally scissors-like relationship but in reverse in that when the legs 10, 13 are brought together like the handles of a pair of scissors, the jaws 11, 14 will be separated, whereas, the ends of a pair of scissor shears would normally be closed together. This reverse relationship is obtained by mounting the jaws 11 and 14 so that they are separated when the legs 10 and 13 are brought together and are closed when the legs 10 and 13 are allowed to separate as shown in FIG. 4.

It will be understood that certain changes in detail may be made in the construction of the trap 5 without departing from the spirit and scope of the invention as defined in the accompanying claims. For example, instead of bending the end of the trigger 24 into the hook 28, a hole 33 (FIGS. 3 and 4) could be punched in the end to releasably receive the distal end of the trip rod 30 when the trap is set and thereby serve the same purpose as the hook.

What is claimed:

1. An animal trap comprising inner and outer, interfitting U-shaped members with the distal ends of the legs of each member being in the form of one-half of an animal gripping jaw with its opposing mating jaw half being on the distal end of the cooperating leg of a second U-shaped member, a shaft extending between the legs of said U-shaped members and fixedly attached adjacent its opposite ends to the legs of one U-shaped member with the legs of the other U-shaped member being pivotally mounted on said shaft, a trigger supporting lever fixedly projecting from said shaft intermediate its opposite ends, at least one coil spring surrounding said shaft with at least one end thereof projecting into driving engagement with a leg of said pivotally mounted U-shaped member and with the opposite end thereof projecting into driving relationship with said lever whereby the torque exerted by said spring urges said jaws to close together in animal gripping relationship, a trigger pivotally mounted intermediate its ends on the distal end of said lever with one end of the trigger in the form of an animal engageable pan and the opposite end having an aperture or a hook formation thereon, a trip rod pivotally mounted at its proximal end on the bight of said U-shaped member having its legs fixedly attached to said shaft, the distal end of said trip rod being releaseably engageable in said aperture or with said hook formation whereby when said trip is in its set condition the bights of said U-shaped members are held together and said jaws are held open against the torque exerted by said spring, and whereby said trap is sprung when an animal lifts said pan and thereby rotates said trigger so as to disengage said trip rod from said aperture or hook formation.

2. The animal trap of claim 1 wherein the legs of said outer U-shaped member are fixedly attached to said shaft and the legs of said inner U-shaped member are pivotal on said shaft.

3. The animal trap of claim 1 wherein said first-mentioned spring end is relatively short and said opposite spring end is relatively longer.

4. The animal trap of claim 1 wherein said trigger supporting lever is mounted on said shaft at approximately, its middle and there is a said coil spring on each side of said lever.

5. The animal trap of claim 1 wherein a protruding stop is mounted on at least one of said one-half of an animal gripping jaws so as to engage its opposing mating jaw half and limit the degree to which said jaw halves close together.

6. The animal trap of claim 5 wherein a said protruding stop is mounted on each jaw half of said U-shaped member which is pivotally mounted on said shaft.

7. The animal trap of claim 1 wherein the bight portions of each said U-shaped member is straight and the legs of each U-shaped member extend at substantially right angles to its bight.

8. The animal trap of claim 1 wherein when said trap is in its set condition the jaws and U-shaped members will be substantially vertically oriented with the jaws in the ground.

9. The animal trap of claim 1 wherein said jaws are relatively thin so as to facilitate both opening and closing while in the ground.

* * * * *